United States Patent [19]

Bachem

[11] 4,292,850

[45] Oct. 6, 1981

[54] AIR PRESSURE TRANSMITTER

[75] Inventor: Christian Bachem, St. Andreasberg, Fed. Rep. of Germany

[73] Assignee: Albin Sprenger KG GmbH & Co., Andreasberg, Fed. Rep. of Germany

[21] Appl. No.: 114,614

[22] Filed: Jan. 23, 1980

[30] Foreign Application Priority Data

Feb. 2, 1979 [DE] Fed. Rep. of Germany ....... 2903994

[51] Int. Cl.³ .............................................. G01L 9/12
[52] U.S. Cl. ....................................... 73/702; 73/718; 361/283
[58] Field of Search ......................... 73/702, 718, 724; 361/283

[56] References Cited

U.S. PATENT DOCUMENTS 3,000,215  9/1961  Atanasoff et al. .................... 73/702
3,425,281  2/1969  Barz ..................................... 73/702

FOREIGN PATENT DOCUMENTS 982930  2/1965  United Kingdom .................. 73/702

OTHER PUBLICATIONS

Abstract No. 136,212, "Pressure Sensitive Apparatus", Janssen, O. G., 10/28/52, vol. 663, p. 1224.

Primary Examiner—Donald O. Woodiel
Attorney, Agent, or Firm—Dennison, Meserole, Pollack & Scheiner

[57] ABSTRACT

An air pressure transmitter for measuring air pressure having a circular diaphragm arranged in a measuring chamber, said diaphragm being surrounded on both sides by thin air layers and limited by rigid walls. The body of the air layers influences the natural frequency of the diaphragm. In order to achieve a high accuracy of measurement and to exclude calibrating instabilities, the diaphragm is configured as a plate of hard beaten material and clamped at its edge between the rigid walls with distance rings of such a thickness that the restoring force of the air layers located within the distance rings, at atmospheric pressure will become approximately three to ten times as high as the restoring force of the diaphragm. The diaphragm itself is inductively excited.

7 Claims, 1 Drawing Figure

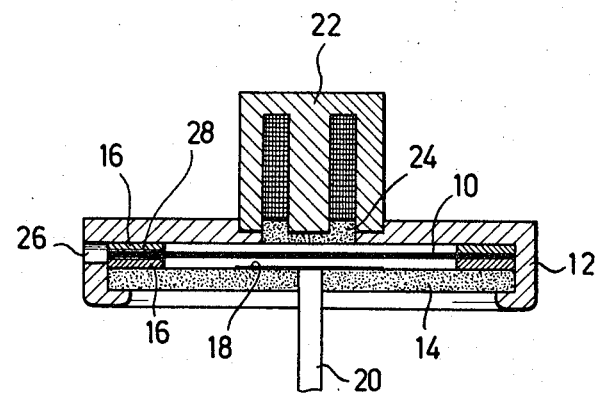

AIR PRESSURE TRANSMITTER

The invention relates to an air pressure transmitter with a circular diaphragm being arranged in a measuring chamber, said diaphragm which is surrounded on both sides by thin layers of the air to be measured and enclosed by solid walls, whereby the body of the air layers influences the proper frequency of the diaphragm.

With respect to the air pressure transmitters of the prior art, the measuring chamber is configured as a double condenser, where the excitation of the earthed diaphragm and the measuring of the diaphragm vibrations is effected electrostatically. In such an air pressure transmitter a stretched light diaphragm is used, where the natural releasing force of the diaphragm is dependent on the elastic radial stress and is relatively very small as compared to the portion supplied by the air layers. Under these conditions the natural frequency of the diaphragm follows the root of the air pressure for several powers of tens. However, the disadvantage in the prior art devices is that the calibrating stability moved only within the dimension of some percent, since the portion contributed by the diaphragm stress to the natural frequency is dependent on temperature and fatigue (ATM Gazette V, 1342-6, 1972). It is the object of the present invention to provide an improved air pressure transmitter wherein the accuracy of measurement will be increased and calibrating instabilities will be excluded.

According to the present invention the prior art problems are solved in that the diaphragm is configured as a plate of hard resilient material, which is clamped at its edge between the solid walls by means of spacer rings of such a thickness that the restoring force of the air layers located within the spacer rings, at atmospheric pressure will become approximately three to ten times higher than the restoring force of the diaphragm. Although the natural frequency of the plate-shaped diaphragm is lessened by its own stiffness, e.g. to 1:2 for a change of the air pressure between 10 mb and 1000 mb (this being of interest for radio weather sondes), changes of pressure of 1 mb can be determined.

According to the invention the diaphragm is inductively excitable in order to operate accurately at low terminal pressures. Preferably at least one of the two solid walls is made of insulating material and has an electrically conductive coating on its surface facing the diaphragm that can be connected to an external oscillator circuit. In another embodiment the special features of the invention are that the diaphragm contains ferromagnetic material; and further that on the rigid wall not having an electrically conducting coating there is mounted or embedded therein an electromagnet, being arranged at the output of the oscillator circuit exciting the natural frequency of the plate. Pursuant to the construction of the air pressure transmitter according to the invention, the diaphragm and the electrically conductive coating correspond to the electrodes of a condenser microphone in order to supply the obtained alternating voltage to the magnet via an amplifier.

The pressure compensation between the air enclosed between the diaphragm and the rigid walls and the atmosphere to be measured is preferably made via fine grooves being provided between the diaphragm and the spacer rings, which continue e.g. into a drilled hole in the wall of the measuring chamber running parallel to the diaphragm.

Further details, advantages and characteristics of the invention can be learned from the following description taken in conjunction with the FIGURE of the air pressure transmitter according to the invention, which FIGURE shows a sectional view of an air pressure transmitter.

In a measuring chamber a diaphragm 10 is arranged configured as a hard resilient plate, being clamped between a metallic wall 12 and a wall 14 which is made of insulating material, and positioned at its edge between spacer rings 16 defining the thickness of the air cushion located at both sides of the diaphragm 10. The wall 12 of metallic material is there configured as a part of a flat cylindrical metal box encircling the wall 14 of insulating material. Thereby the bottom area adjacent to the wall 14 has a preferably circular opening. The wall 14 of insulating material has a thin electrically conducting coat 18, which is electrically led to the outside via a cable 20 filled with insulating material. The metallic wall 12 has an electromagnet 22 fitted herein in an airtight manner and with an insulating piece 24 being in alignment with the inner surface of the wall 12 facing the diaphragm 10.

Of course, the construction of the elements 10, 12, 14, and 16 can be done in any other manner, as for example plates or rings being glued together instead of pressing one element on top of the other by flanging the edge of the box 12 as shown in the example of the preferred embodiment.

In order to provide pressure compensation between the air enclosed in the layers between the diaphragm 10 and the inner surfaces of the walls 12 and 14 and the atmosphere to be measured, the cylindrical metal box has a bore 26 on the peripheral surface in the area of the spacer rings 16, which bore continues in fine grooves 28 for a communication to the areas within the measuring chamber.

To excite the self-oscillation of the diaphragm one can use an amplifier, of which the output acts on the magnet 22 whereby the input of the latter is fed with the alternating voltage of its natural frequency. This is obtained by the configuration of the diaphragm 10 and the electrically conductng layer 18 arranged on the wall 14 which is made of insulating material, having the same effect as the electrodes of a condenser microphone. For this purpose preferably the diaphragm socket is used as an electric contact and the electric connection led through the bore 20, which is filled with insulating material, as the other electric contact.

The magnetic excitation of the diaphragm 10 configured as a hard beaten plate is much better suited for the operation of low terminal pressures than the capacitive excitation of same, whereby also in addition the metallic wall 12 could be configured as a metal-coated insulating layer.

It should be especially emphasized that the measuring accuracy can be improved if the air layers on both sides of the diaphragm 10 are of a thickness decreasing from the center toward the edge, running approximately proportional to the deflection of the diaphragm 10 clamped at its edge. For this purpose cavities can be ground in the walls 12 and 14 according to Bessel function 10.

I claim:

1. An air pressure transmitter with a circular diaphragm arranged in a measuring chamber, said diaphragm being surrounded on both sides by thin layers of the air to be measured and limited by rigid walls, whereby the body of the air layers is influencing the natural frequency of the diaphragm, characterized thereby that the diaphragm (10) is configured as a plate of hard beaten material and at its edge is clamped between the rigid walls (12, 14) with distance rings (16) of such a thickness that the readjusting power of the air layers located within the distance rings (16), at atmospheric pressure will be three to ten tims more than the readjusting power of the diaphragm (10).

2. An air pressure transmitter according to claim 1, characterized thereby that the diaphragm (10) can be inductively excited.

3. An air pressure transmitter according to claim 1 or claim 2, characterized thereby that at least one of the two rigid walls (14) is made of insulating material and has an electrically conducting coat on its surface facing the diaphragm (10), that can be connected to an oscillator circuit.

4. An air pressure transmitter according to claim 1, characterized thereby that the diaphragm (10) contains ferro-magnetic material; that an electromagnet (22) is mounted on the rigid wall (12) not having an electrically conducting coat or is embedded therein, and positioned at the output of the oscillator circuit exciting the natural frequency of the diaphragm (10).

5. An air pressure transmitter according to claim 1, characterized thereby that the diaphragm (10) and the electrically conducting coat (18) are equalent to the electrodes of a condenser microphone.

6. An air pressure transmitter according to claim 1, characterized thereby that pressure compensation is effected between the air enclosed between the diaphragm (10) and the rigid walls (12, 14) and the atmosphere to be measured by means of fine grooves (28) arranged between the diaphragm (10) and the distance rings (16).

7. An air pressure transmitter according to claim 1, characterized thereby that the air layers on both sides of the diaphragm (10) are of a thickness decreasing from the center toward the edge, which thickness is running approximately proportional to the deflection of the diaphragm (10) clamped at the edge.

* * * * *